United States Patent [19]
Bowker et al.

[11] Patent Number: 5,467,122
[45] Date of Patent: Nov. 14, 1995

[54] UNDERWATER IMAGING IN REAL TIME, USING SUBSTANTIALLY DIRECT DEPTH-TO-DISPLAY-HEIGHT LIDAR STREAK MAPPING

[75] Inventors: Kent Bowker, Essex, Mass.; Stephen C. Lubard, Woodland Hills, Calif.

[73] Assignee: Areté Associates, Sherman Oaks, Calif.

[21] Appl. No.: 46,335

[22] Filed: Apr. 12, 1993

Related U.S. Application Data

[63] Continuation-in-part of Ser. No. 781,038, Oct. 21, 1991, abandoned.

[51] Int. Cl.⁶ .................................................. H04N 7/18
[52] U.S. Cl. ............................ 348/31; 348/144; 348/215
[58] Field of Search .............. 358/109, 95; 250/213 VT; 356/318; 359/618, 856; 348/31, 81, 144, 145, 147, 135, 215, 61

[56] References Cited

U.S. PATENT DOCUMENTS

| Re. 33,865 | 3/1992 | Knight et al. | 358/209 |
|---|---|---|---|
| 3,719,775 | 3/1973 | Takaoka et al. | 358/109 |
| 4,704,634 | 11/1987 | Kato et al. | 358/217 |
| 5,140,463 | 8/1992 | Yoo et al. | 359/559 |
| 5,142,372 | 8/1992 | Alfano et al. | 358/209 |
| 5,212,667 | 5/1993 | Tomlinson, Jr. et al. | 367/7 |
| 5,278,403 | 1/1994 | Alfano et al. | 250/214 VT |

*Primary Examiner*—Tommy P. Chin
*Assistant Examiner*—Bryan S. Tung
*Attorney, Agent, or Firm*—Ashen & Lippman

[57] ABSTRACT

An imaging system for detecting the contents of a turbid medium, such as water or air, which is at least partially transmissive of light. The system includes a light source for producing a series of discrete fan-shaped pulse beams which are substantially uniform in intensity or have been peaked at the edges of the fan to illuminate sections of the medium, a streak tube with a large photocathode for collecting the maximum amount of light from weak returns, a field-limiting slit disposed in front of the photocathode for removing multiply scattered light, a large aperture optical element for collecting and focusing the reflected portions of the pulse beam on the field-limiting slit and the photocathode, and an array of detectors. A volume display of the medium is generated by translating the transmitter and receiver normal to the longitudinal axis of the pulse beam to illuminate adjacent sections of the medium, and combining the sections to provide a volume display. All, or substantially all, of the light returned from each pulse beam is utilized. Vehicle motion is used to provide the scan of the pulse beam.

47 Claims, 4 Drawing Sheets

UNDERWATER IMAGING IN REAL TIME, USING SUBSTANTIALLY DIRECT DEPTH-TO-DISPLAY-HEIGHT LIDAR STREAK MAPPING

BACKGROUND OF THE INVENTION

This application is a continuation-in-part of application Ser. No. 07/781,038, filed Oct. 21, 1991, now abandoned.

This invention relates generally to an imaging system for detecting a target in a turbid medium. More particularly, this invention relates to a system for detecting an underwater target using lidar.

Several techniques have evolved over the years for overcoming the problems associated with detecting targets in a light scattering medium. One technique utilizes a narrow beam from a pulsed laser, such as a doubled YAG, to scan the ocean. Generally, the beam transmitter and the receiver aperture, which must be quite large to collect sufficient energy, are scanned together, using scanning mirrors or other devices such as prisms. The energy received from each pulse is detected with a photomultiplier, or similar quantum-limited device, and the resulting signal is amplified with a logarithmic response amplifier, digitized, and then processed. Because the pulses are short, typically 10 nanoseconds, the detection electronics must be very fast, digitizing at 200 MHz or faster. Since the pulse rate is low, the processing rates required to analyze the data from each pulse are within the state of the art. Such methods require the use of mechanical scanners that are slow and difficult to build, particularly if they are to be mounted on aircraft. In accordance with a primary advantage of the present invention, the need for fast digitizing electronics and mechanical scanners is eliminated.

Another technique is range gating, which utilizes a pulsed flood beam and a number of gated image intensifiers with charge-coupled devices (CCD's). The intensifiers are gated on when the beam pulse reaches a specific depth. Typically, the gate is applied just as the pulse beam that encounters the object returns to the receiver so that the full reflected return is obtained. A second intensifier is gated on a little later to detect the shadow of the object. The image of the target is obtained by taking the difference of the two images which then eliminates the sea water backscatter and enhances the target signature.

There are numerous drawbacks associated with the range gating technique. Specifically, range gating does not allow utilizing all, or substantially all, of the information returned from each pulse to create three-dimensional data sets. Rather, in such prior art systems, a volume of the medium is illuminated and by range gating, a specific section of the illuminated medium is selected. Thus, the signal above and below the range gate is rejected. Consequently, of the energy transmitted into the volume of the medium, only a small amount of the return is used. Additionally, a three-dimensional data set cannot be created from a single pulse. Rather, three-dimensional information can only be obtained by collecting many pulses, during which time the aircraft, or other vehicle must remain stationary. A large multiplicity of shots is required to create an image, thus wasting energy from the laser.

Despite the availability of such techniques, existing lidar systems are limited by the size of the receiver optics that can be used in a scanner. Generally, the light reflected from targets which are deeply submerged or are submerged in a very turbid medium is weak. Although large aperture optics can aid in maximizing the amount of light collected from weak returns, the size of the optics that can be used in a scanner is restricted by the size of the moving prisms or mirrors. Such cumbersome mechanisms can be eliminated, as in the present invention, by utilizing the motion of a vehicle, a boat or an aircraft carrying the system so that the dimensions for scanning can be reduced to one. However, the scanning problem is still formidable and restricts the size of the apertures that can be used. Moreover, volume scanning systems are very expensive, and require considerable power and weight. Consequently, the ability to install such systems in aircraft or other vehicles is restricted.

Furthermore, those systems which utilize range gating, instead of volume scanning, suffer from poor range resolution and area coverage. When the target is at a different depth than expected, the target return will be subtracted as well as the background, and poor performance results. Additionally, very large pulse energies are required to obtain sufficient signal-to-noise ratios to detect objects at even moderate depths.

What is needed is an imaging system which provides an accurate and reliable image of an underwater target, eliminates the problems associated with mirror scanning and utilizes all, or substantially all, of the information returned from each pulse to eliminate wasting energy from the laser.

The preceding and other shortcomings of prior art systems are addressed and alleviated by the present invention which provides a system which can penetrate a turbid medium over a considerable slice (width) without scanning or requiring fast electronic devices.

SUMMARY OF THE INVENTION

The present invention provides an imaging system for detecting a target in turbid medium, such as water or air. The system includes a means for generating a periodic series of discrete pulse beams in the shape of fan beams, each of which are substantially uniform in intensity, or with greater amounts of energy at the ends of the fan to compensate for losses due to the greater distance, to illuminate sections of the medium.

In operation, a single pulse beam is emitted to illuminate a section of the medium. A large aperture optic collects the back reflected portions of the pulse beam and focuses the reflected portions on a field-limiting slit. The field-limiting slit, located in front of the photocathode, rejects multiply reflected light. A lens, positioned between the field-limiting slit and the photocathode, reimages the image on the field-limiting slit onto the photocathode. Coupled to the streak tube is an imaging detector, typically a CCD, which detects signals generated by the streak tube in response to the reflected portions of the pulse beam impinging on the photocathode. Other imaging detectors, such as a TV camera or photodiode array may also be used To obtain a volume display of the medium, the generating means is moved normal to the longitudinal axis of the pulse beam so that each pulse illuminates adjacent sections of the turbid medium. A volume display of the medium is thus generated by combining the returns from adjacent sections of the medium. All, or substantially all, of the light returned from each pulse is utilized.

The photocathode on the streak tube is a thin strip behind a field-limiting slit on which the illuminated strip of the ocean, or scattering medium, is imaged by the receiver optics. When the laser beam pulse, typically a few nanoseconds in duration, returns to the receiver from the surface of the water, the electronic sweep of the tube is initiated, so that the following time history of the returning signal spread across the lateral surface of the tube anode is then a record of the reflection from the medium itself and from any submerged bodies in the medium, such as mines or submarines, including the reflection from the top surface of such objects and of the shadow below them. Because the slit cathode is long and covers the width of the ocean illuminated by the fan-shaped beam from the laser, the image on the anode phosphor or area detector is a wide vertical section of the ocean. In addition to imaging objects immersed and floating in the medium, the invention also applies to imaging objects on the bottom and to obtaining a profile of bottom topography that may be the only way to distinguish silt covered objects, such as archaeological remains lying on the bottom, from the bottom itself.

The invention described herein can be employed, for example, from a fixed wing aircraft or helicopter, from boats on the water surface, or from submerged vehicles for search at great depths. The invention is not exclusively restricted to use on oceans or lakes, but is useful in probing the contents of any turbid media through which light can pass, even if absorbed and scattered, as long as some return can be obtained. For example, the invention can be used to detect a target in air. The items described in the following description are applicable to water probing, but there is no reason that the concept cannot be applied to the analysis of smaller volumes using very short laser pulses, picoseconds duration for example, since the streak tube can capture such time intervals.

The image on the anode can be photographed by means of a CCD camera or similar device, particularly by logarithmic area array CCD-like detectors, which is read out slowly compared to the fast duration of the returning signal. The anode can also be replaced by a thinned backside illuminated CCD. This enables one to view the phenomena on a cathode ray screen directly, or after encoding the signal, to enable one to process such images to obtain enhanced imagery through various means common to those versed in the art of enhancement, such as subtracting the mean return from the recorded ocean section. The subsequent display of such ocean sections can be manipulated by adding many sections together to provide a three-dimensional view of the underwater scene. Such three-dimensional data sets, obtained by moving the sensor system normal to the fan beam between each exposure so that each section is from an adjacent section of the ocean, provide the ability to enhance detection and reduce false alarms by rejecting images, such as fish, that might not be apparent in any single section image. All of the light returned is utilized in creating three-dimensional data sets, thus not wasting energy from the laser.

The foregoing and additional features and advantages of this invention will become further apparent from the detailed description and accompanying drawing figures that follow. In the figures and written description, numerals indicate the various features of the invention, like numerals referring to like features throughout for both the drawing figures and the written description.

DETAILED DESCRIPTION OF THE PREFERRED EMBODIMENT

Figure 1:
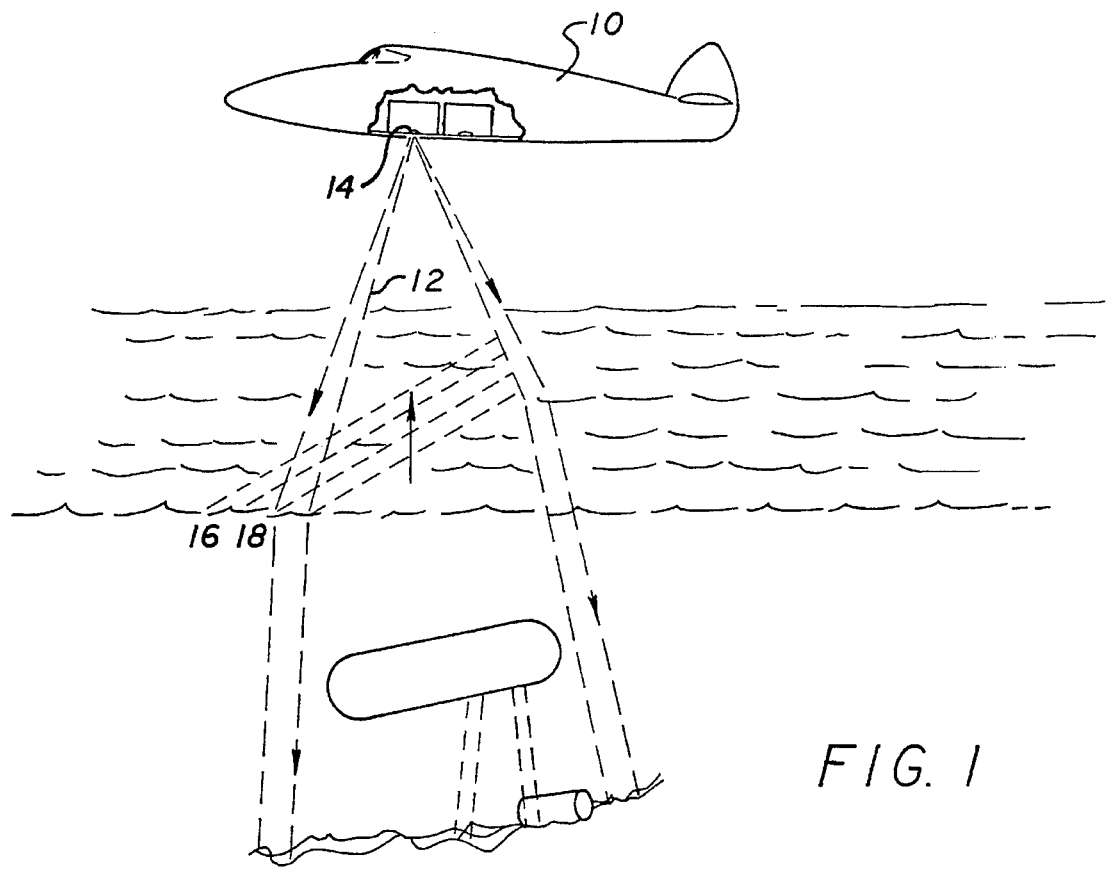
FIG. 1 shows a schematic showing of an aircraft employing the present invention to view objects underwater.

The present invention provides a system for detecting targets located in a light reflecting medium, such as water. The system can be utilized to observe a water interface, the structure of the medium including the distribution of particulate matter or suspended bodies, a bottom profile, and objects included in any of these. More particularly, the invention can be used to detect targets in any medium through which light can pass, even if absorbed and scattered, as long as some substantially directly reflected light can be obtained. For example, the system can be used to detect a target in air.

The system includes a light source for producing a series of discrete pulse beams which have a modified non-uniform intensity distribution to produce uniform signal-return. The reflected portions of the pulse beam are received by a detection system comprising receiving optics, a streak tube and an imaging area detector. In operation, the invention is mounted on a vehicle adapted for movement over the target area. A light source emits periodic, narrow, fan-shaped pulse beams to illuminate a succession of thin-slices of the turbid medium.

The detection system includes a light collecting optic, a field-limiting slit, a streak tube and an imaging area detector. The light collecting optic collects reflected light and images it on a field-limiting slit, which rejects multiply scattered light. A lens, disposed between the field-limiting slit and a photocathode on a streak tube, focuses the image on the field-limiting slit onto the photocathode. Because of the narrow fan-shaped illumination and the field-limiting slit at the cathode, the light collected is substantially directly reflected light, and not light multiply reflected by the medium, thus providing improved image contrast.

To collect the maximum amount of light from weak returns, the aperture of the optic should be as large as possible. The photocathode on the streak tube, however, should be sufficiently large to encompass the image of the fan beam illuminated volume.

Inside the streak tube, the photoelectrons emitted from the photocathode are accelerated and then electrostatically focused on the phosphor layer or anode of the streak tube. On passage from the cathode to the anode, the photoelectrons pass through a deflecting electric field which causes the photoelectrons to sweep across the anode. The deflecting electric field is created when a varying voltage is applied to the deflecting plates in the tube. The result is a two-dimensional signal, consisting of the temporal variation of the detected light reflected from the turbid medium in one dimension, and the lateral position of the reflected light over the narrow, fan-shaped pulse beam in the other direction. The focused electrons can be sensed directly by an area detector, such as a thinned backslide illuminated CCD, or the electron energy can be converted to light by a phosphor. The light emitted from the phosphor layer on the anode is coupled to a detector array.

A volume display of the medium is generated by translating the transmitter and receiver normal to the longitudinal axis of the fan-shaped pulse beam to illuminate adjacent sections of the medium, and combining the sections to provide a volume display. All, or substantially all, of the light returned from each pulse is utilized to create three-dimensional data sets. The motion of the vehicle is used to provide the scan or motion of the fan-shaped pulse beam.

The present invention is not exclusively restricted to analyzing the contents of large volumes. By using very short pulses, picoseconds in duration for example, the present invention can be used to analyze smaller volumes. The streak tube observes the rapid return of the backscattered light by distributing the return in space and then reading the return out slowly. The return is in nanoseconds and picoseconds and the system of this invention allows a readout in milliseconds, thus obviating the necessity for faster electronic readouts. All of the signal from each pulse of the fan-shaped pulse beam width and depth that is back reflected is observed at once, avoiding the need to use a multiplicity of pulses to obtain three-dimensional information.

Normally, laser beams are non-uniform in intensity, with a maximum intensity at the center of the beam and a minimum intensity at the outermost edges of the pulse beam. This can be changed by applying tapered coatings to the laser mirrors, or by the use of optical means external to the laser. An optical invertor, comprised of a series of lenses and a diamond-shaped mirror arrangement, enhances the intensity at the outer portions of the pulse beam by optically inverting in one dimension along the fan width the intensity pattern of the pulse beam. The result is a pulse beam which compensates for the effect caused by longer paths at the ends of the fan to produce a signal return that is substantially uniform in intensity.

FIG. 1 shows a typical configuration of an aircraft 10, employing the present invention to detect underwater targets. The invention can also be used to detect targets in other turbid media, such as air. The invention can also be deployed from a vehicle such as a helicopter, a boat, or if searching at great depths, a submerged vehicle. A narrow, fan-shaped pulse beam 12 is projected from the transmitter to the water below, with the longitudinal axis of the pulse beam 12 normal to the direction of flight. The pulse beam 12 illuminates a thin section in the water. Coverage of a volume of the water is obtained by issuing a series of discrete pulse beams 16–18 to illuminate adjacent sections of the water. After processing the successive slice images, the sections can be displayed to show a scan through a volume of the medium. Thus, the motion of the vehicle carrying the system is used to provide the scan of the pulse beam. The pulse rate to generate the series of discrete pulse beams is set by the aircraft velocity. In general, the pulse rate may be high and the beam width on the water surface narrow compared to the resolution determined by the imagery detector pixels. This is done to preserve temporal resolution, which can be reduced if the spatial width becomes large. In order to reduce the number of readouts of the CCD, the pulses can be accumulated on chip.

Figure 2:
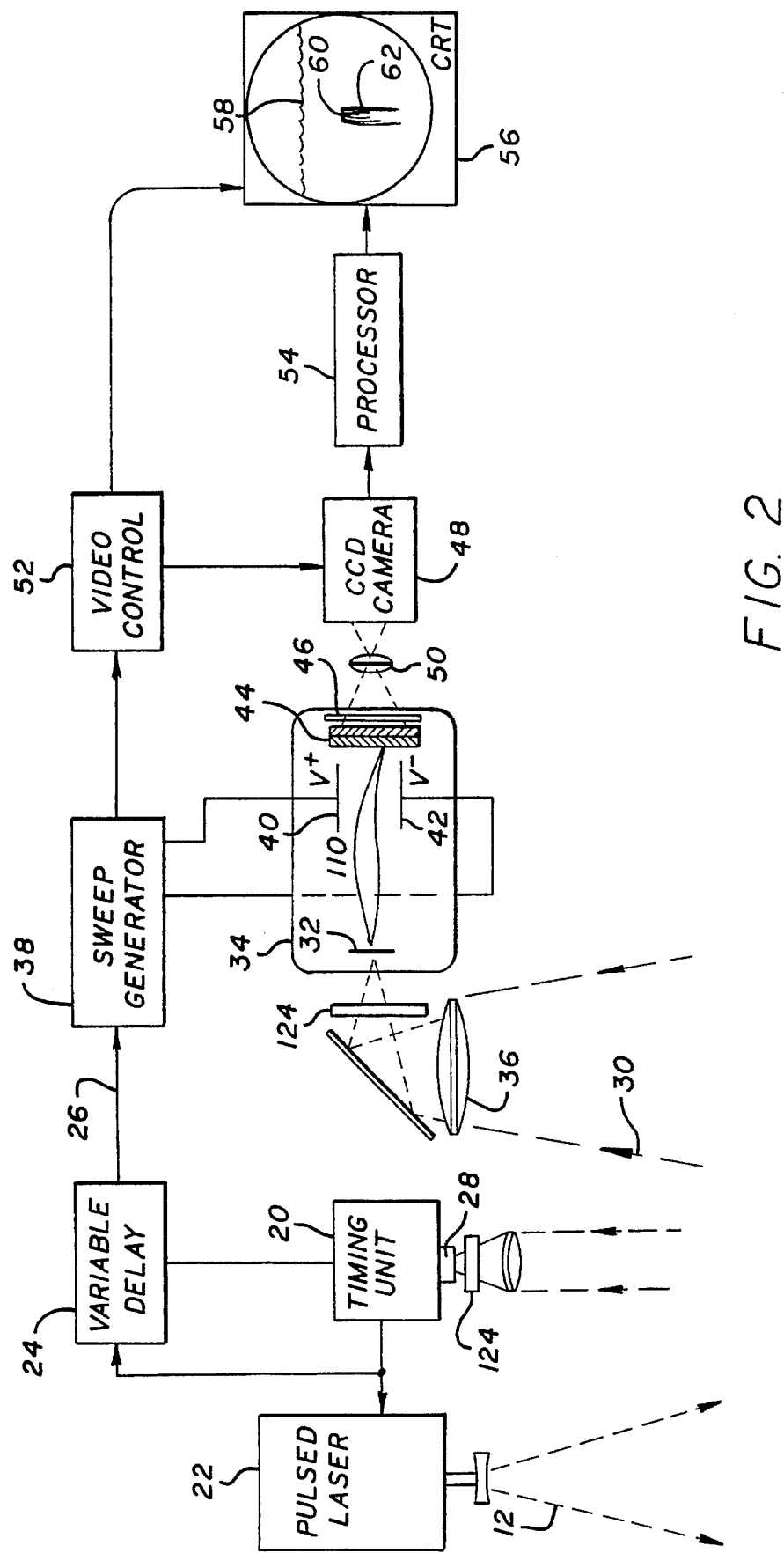
FIG. 2 is a block diagram of the preferred embodiment of the invention.

FIG. 2 shows a block diagram of the preferred embodiment of the invention. A timing unit 20 initiates the probing sequence by causing a laser 22 to emit a narrow, fan-shaped pulse beam 12 to illuminate a thin section in the water. After the Q-switch 84, shown in FIG. 5, in the laser 22 has closed, causing the laser to fire, the timing unit 20 initiates the variable delay unit 24. The variable delay unit 24 issues a delay pulse 26 to initiate the receiving unit. In order to insure that the delay is correct, a detector 28, such as a photomultiplier, is used to sense reflected portions 30 of the pulse beam. The timing unit 20 measures this time and resets the variable delay unit 24 to insure that the next delay pulse 26 is correct. Since the delay is variable, the invention can be operated at different aircraft altitudes.

The reflected portions 30 of the pulse beam are collected and focused on the photocathode 32 of a streak tube 34 by an optical element, shown here as a lens 36. The image, which includes a wide spread of scattered light, is chopped by the field-limiting slit 126 which is aligned with the image of the fan-beam, and serves to reject scattered light as well as limit the width of the electron image to a width smaller than the temporal sampling obtained by the pixels in the imaging detector. A lens 125, positioned between the field-limiting slit 126 and the photocathode 32, reimages the image on the field-limiting slit 126 onto the photocathode 32. The photoelectrons 110 emitted from the photocathode 32 are accelerated by the streak tube anode voltage, and are focused into a line on the anode 44 by the electrostatic or magnetic field distribution in the streak tube 34, and are deflected by the electrostatic field set up between the deflection plates 40 and 42 in the streak tube 34. In other words, one field forms the image, and the other field set up between the deflection plates 40 and 42 moves the image. The delay pulse 26 initiates the action of a sweep generator 38, which causes a linearly increasing voltage 43 and 45 to be applied to the deflection plates 40 and 42 on the streak tube 34. The line electron image is deflected by the deflection plates 40 and 42 so that the line sweeps across the streak tube anode 44, thus converting a temporal variation in the input signal into a spatial distribution on the anode 44. The anode 44 may be made of a phosphor, but since there are few photoelectrons from the return when the beam has penetrated many diffusion lengths in the water, additional photon gain is desired. Thus, the anode 44 is preferably made of a microchannel plate (MCP) intensifier, which provides the gain required to make photoelectrons detectable. The electron output of the MCP is converted to photons again by means of a phosphor layer 46, so that the image of the temporal variation over the narrow fan-shaped pulse beam 12, now converted to a two-dimensional image, can be coupled to a detector array 48 by a coupling device, such as a lens 50. Other coupling devices, such as a fiber optic, may be used. The detector array 48 shown is a CCD, but it could easily be a diode array, and, in particular, a photodiode n-channel MOSFET array or diode limited CCD that provides a logarithmic response to high light levels.

If the accelerating voltage is high, gain can be obtained through the ionization created by the electrons directly in the detector. Thus, the anode 44 can be made of a backside thin CCD fabricated for this purpose, and a MCP and phosphor are not required.

The CCD detector array 48 is set to receive the image, before it arrives, by reading out the preceding frame. Once the sweep generator has completed the voltage rise and resets, a command is issued to the video control 52 to read the image on the CCD. The data is then passed to a processor 54, or directly to a cathode ray tube display 56, where a waterfall like display of the section of the ocean probed by the pulse beam 12 can be seen. Typical images are that of a water surface 58, a reflecting object 60, and a shadow from the reflecting object 62.

The subsequent display of such ocean sections can be manipulated by adding many sections together to provide a volume display of the underwater scene. Specifically, the sensor system is moved normal to the longitudinal axis of the pulse beam 12 between each exposure to illuminate adjacent sections of the ocean. The adjacent sections are then combined to obtain a volume display.

As described, the present invention would only be able to probe deep depths at night because of solar illumination. For the system to operate in the day, narrow band interference filters 124 are required. The filters 124, placed in front of the photocathode 32 of the streak tube 34, are designed to pass the wavelength of the laser and block all other wavelengths. The combination of the filters 124 and the short time each element in the detector array 48 sees photoelectrons 110, typically 5 nanoseconds thereby resolving 0.56 meter in depth, would insure that no more than a few background photoelectron count in any pixel would be obtained.

Figure 3:
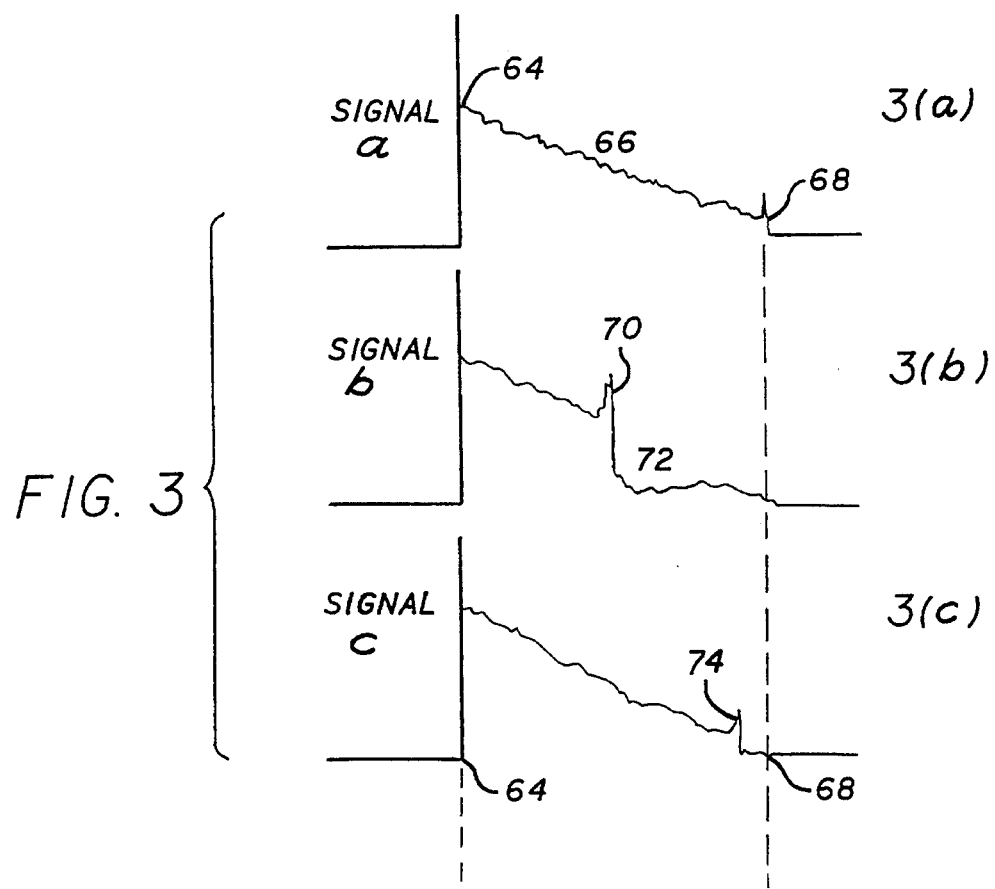
FIG. 3 is a timing diagram of signals obtained from use of the preferred embodiment in the system of FIG. 1.

FIG. 3 shows a timing diagram of signals obtained from the reflected portions 30 of the pulse beam. The time history of the reflected portions 30 of the pulse beam comprises a record of the reflection from the medium itself, and from any submerged bodies in the medium, such as mines or submarines, including the reflection from the top surface of such objects and of the shadow below them. Because the part of the ocean illuminated by the pulse beam 12 is limited to a very thin section, the image on the phosphor layer 46 is a wide vertical section of the ocean. The image can be photographed by means of a CCD camera or similar device, particularly by logarithmic area array CCD-like detectors, which read out slowly compared to the fast duration of the returning signal. Consequently, the phenomena on the cathode ray tube display 56 can be viewed directly, or the image can be processed by a processor 54 to obtain enhanced imagery after the signal has been encoded. For the latter, various common enhancement means, such as subtracting the mean return from the recorded ocean section, can be utilized.

In the regions of the pulse beam in which there are no objects, as shown in FIG. 3(a), there will be a sharp return from the air-water interface 64 and then a smaller exponential return from the backscatter from the water itself 66. The signal will end with a second sharp return 68 from the bottom, assuming the system can reach such a depth. The range capability of the system will depend on the attenuation length of light in the medium traversed. For example, the attenuation length of light in water varies from 40 meters, for Jerlov Type I clear ocean water, to a few meters, for Jerlov Type C turbid bay water.

When the pulse beam encounters a submerged object, as shown in FIG. 3(b), the reflected portions of the pulse beam will be typified by a sharp leading edge 70 which will vary over the width of the pulse beam due to the roundness of the object. Following the return will be a shadow 72. Thus, the combination of the sharp leading edge 70 and the shadow 72 will comprise the signature of a submerged body.

In addition to detecting targets which are immersed or floating in the medium, the present invention also detects targets lying on the bottom of the medium. When the beam encounters an object on the bottom, as shown in FIG. 3(c), the system will detect a return from an object on the bottom 74 before it will detect a return from the bottom where no object is present 68. Thus, with a profile of the bottom topography, silt covered objects, such as archaeological remains or mines lying on the bottom, can be distinguished from the bottom itself.

Figure 4:
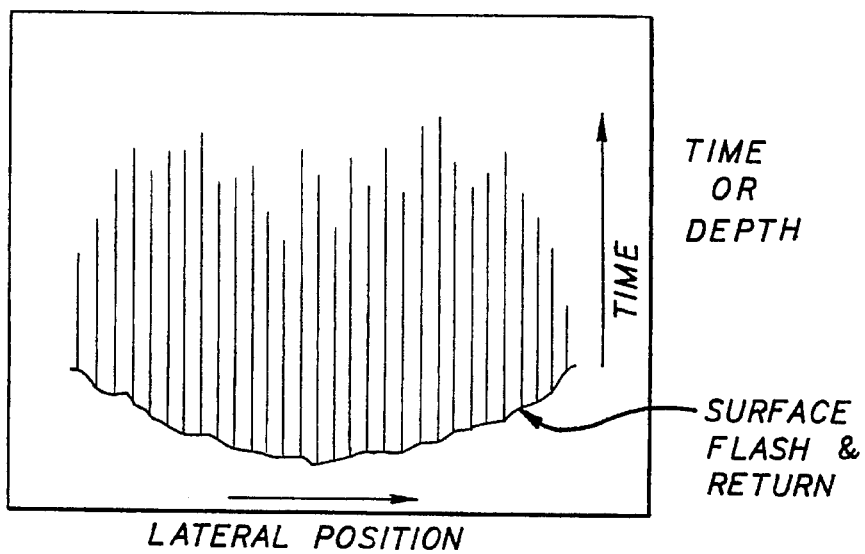
FIG. 4 is a diagram of the beam distribution on the MCP, phosphor and CCD.

A diagram of the beam distribution on the MCP, phosphor and CCD is shown in FIG. 4. The task of detecting the various components out of the return requires an analysis of the waveforms, such as those shown in FIGS. 3(a)–3(c), over the width of the fan. This analysis is enabled by the principle embodiment of the invention that utilizes the streak tube to present a spatial display of all parts of the fan beam as a map of position versus time, or depth.

Figure 5:
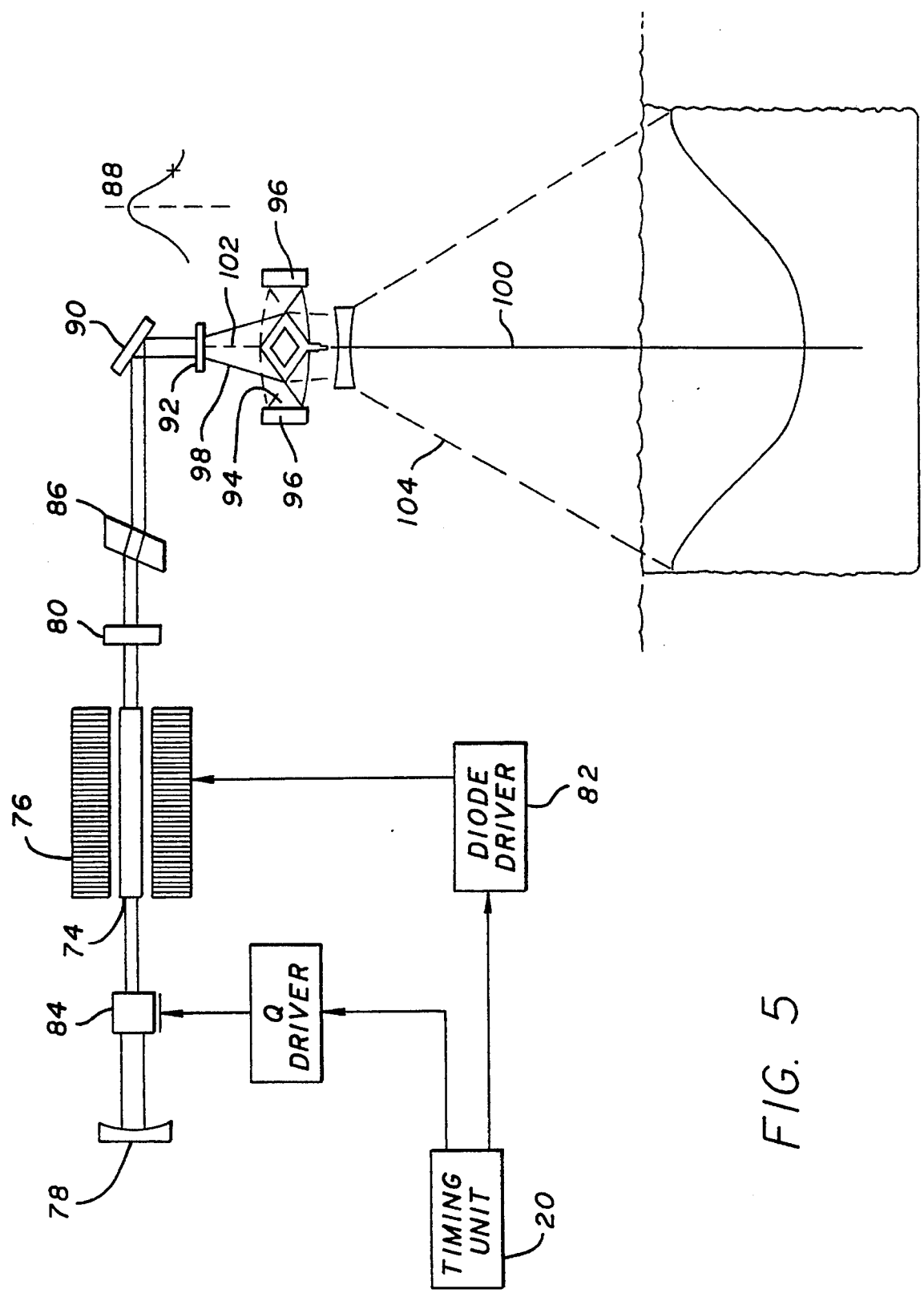
FIG. 5 is a schematic diagram of the laser and the projection optics of the preferred embodiment shown in FIG. 2.

The laser and the output projection optics are depicted in detail in FIG. 5. The laser required for the lidar of this invention is a typical Q-switched laser that can produce pulse widths of the order of 5 to 15 nanoseconds. For purposes of illuminating the ocean and penetrating it, wavelengths in the vicinity of 470 nanometers are optimum. In very turbid water, however, yellow matter reduces the penetration at this wavelength so that the optimum wavelength can be as long as 532 nanometers. Applicable lasers are doubled Nd-YAG, or Nd-YOS, Excimer lasers using the C-A transition in XeF, and Copper vapor. All of these can provide considerable power, in the order of joules/pulse at the reasonably high rates required for observations from aircraft. Diode pumped Nd-YAG for example could provide 1 joule at 30 Hz.

Shown in FIG. 5 is a typical diode pumped YAG laser, consisting of the YAG rod 74, diode pumps 76 with a reflector 78, and an output coupling mirror 80 forming the resonant cavity of the laser. The diode pumps 76 are driven by a diode driver 82 triggered by the timing unit 20. When the rod 74 has been exposed to the pump energy and is maximally excited, the Q-switch 84 is opened and the lasing action sweeps through the excited states to produce an intense short pulse. These lasers commonly emit in the infrared, 1.06 micrometers. However, a nonlinear crystal in the path of the beam 86 can be arranged so that the frequency of the radiation is doubled to give the desired wavelength at 0.53 micrometers.

The output of the laser, for the energy levels required, will be a beam with a half width of 4–6 mm. The beam will be expanded so that it can cover a 5 by 1500 meter area on the ocean surface from a typical altitude of 1500 meters by means of an anamorphic optical element which has a focal length of −1.5 meters aligned with the flight direction. This would produce the 5-meter wide slice and a focal length of −7.5 mm in the other direction to produce the 1000 m cross track illumination.

If the beam is gaussian 88, an optical invertor can be used to enhance the intensity of the outer portions of the pulse beam. After the beam is directed downward by a mirror 90 and slightly diverged by lens 92 it arrives at a diamond-shaped mirror arrangement 94 which cuts it into two parts as shown by the dashed lines, and reflects it outward to a set of mirrors 96, which return the beams to the central mirror arrangement 94. Because the beams reflect from three mirrors, the parts of the beam that were outside 98, and were the least intense, now fall at the inside of the beam 100. In the same respect, the parts of the beam that were in the inside 102, which were the most intense, now fall on the outside of the beam 104. This results in an inverted intensity pattern which then compensates for the increased path length to the ends of the pattern and for the cosine losses on illumination and on the return, to provide a more uniform signal over the illuminated region.

Figure 6:
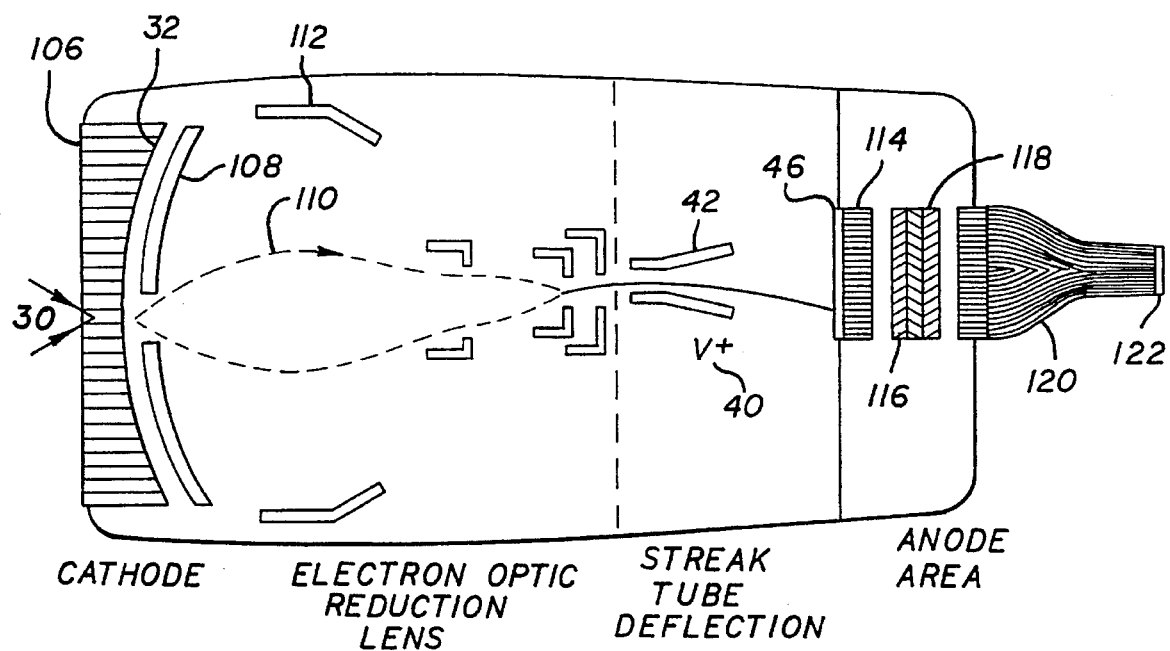
FIG. 6 is a schematic diagram of the detection system of the preferred embodiment shown in FIG. 2.

FIG. 6 is a schematic diagram of the detection system with the preferred embodiment. The most important part of the detection system is the streak tube. Any of the existing and commercially available designs are applicable to the invention, but there are characteristics which make some streak tubes better than others. The important specifications are cathode size, resolution and speed.

The photocathode 32 should be as wide as possible to permit the use of a large light collecting optic. This is because the signal E that is collected by a detector element with an area A, in an optical system with a numerical aperture n.a. is given by the equation, $$E = \pi B (n.a.)^2 A \qquad (1)$$

where

B=magnetic flux density n.a.=$1/(2 \cdot f/\#)$, f=focal length.

The brightness of the lidar return is given by the laser energy, and the highly attenuated scattering from the object, or the water. The numerical aperture of the light collecting optics is limited practically to 0.5, (f/1 optics), since the focal length f is equal to the aperture diameter. The only way to obtain an increased signal is to increase the detected sample area on the photocathode. For example, if a 30 mm long photocathode (which could be as narrow as the field-limiting slit) was used to cover 300 samples over 1500 meters of surface, the focal length of the optic could only be as large as 17 mm, and the aperture area to collect the return laser light would only be 2.2 cm$^2$, which is very small. Large photocathodes, however, are available in X-ray imaging tubes and scintillation detectors, and electron optics are capable of imaging the photoelectrons. At present, there are intensifier tubes with S-20 300 mm photocathodes which would permit light collecting optics with aperture areas as great as 220 cm$^2$ to be used. These intensifier tubes have a signal strength 100 times greater than the signal strength of smaller, more readily available, tubes. Thus, the possibility of building or obtaining a large streak tube which would utilize the electron optics of larger intensifiers is well within the state of the art.

In order to view a 1500-meter swath width, the resolution of the streak tube should be sufficient to permit observing 300 samples in width and time. Moreover, to view depths of 150–300 meters, a streak tube should have 5–10 nanosecond resolution.

Even with a photocathode 32 as large as 300×1 mm, as shown in FIG. 6, the final image can be placed on a CCD as small as 7.5×7.5 mm. (Standard CCD size is 6.6×8.8 mm.) The light 30 from a fast large aperture light collecting optic 36 (f/1, 170 mm focal length), shown in FIG. 2, focuses on the fiber optic input window 106 and passes to the photocathode 32. The extraction electrode grid 108 accelerates the emitted photoelectrons 110 which are focused on the phosphor layer 46 by the focus electrodes 112. A varying voltage 40 on the deflection plates 40 and 42 causes the position of the photoelectron beam 110 to change rapidly, giving an output whose intensity versus distance is proportional to the input intensity versus time.

At the phosphor layer 46, the photoelectrons 110 are converted to photons, with some gain due to the accelerating voltage. The photons are then coupled to a second photocathode 114 at the input of an image intensifier consisting of microchannel plates (MCP's) 116. This permits the event to spread over the MCP structure to reduce the poor noise factor caused by wide pulse shapes and losses in pore structures that degrade typical MCP performance. At the output of the MCP's 116, a second phosphor layer 118 converts the photoelectrons to photons. The size of the second phosphor layer 118 and the MCP's 116 is about 40 mm, thus permitting a 30×30 mm image area. Typical dynamic electron optic resolutions and MCP resolutions are of the order of 10 lines/mm.

The last part of the detection system is the coupling of the second phosphor layer 118 to the detector array 122. Coupling to the CCD is often done by a lens 50, as shown in FIG. 2, or by a fiber optic coupler. The demagnification required is about the same in both cases, as is the loss in gain of 16 that is the result of a 4× reduction to typical 6.6×8.8-mm CCD's containing 25-micrometer photodetectors.

Commercially available streak tubes have photocathodes up to 30-mm in diameter, output phosphors up to 44 mm in diameter, and may have built-in MCP's. Speed and resolution are compatible with the specifications given above.

While this invention has been described with reference to its presently preferred embodiment(s), its scope is not limited thereto. Rather, such scope is only limited insofar as defined by the following set of claims and all equivalents thereof.

What is claimed is:

1. An imaging system for forming an image of a section of a turbid medium together with objects therein, said system comprising:

laser means for projecting a pulse beam to illuminate a thin segment of such turbid medium;

a streak tube, having a cathode, for generating a two-dimensional optical signal;

a field-limiting slit disposed in front of said cathode for rejecting multiply reflected light;

optical means disposed in front of said field-limiting slit for imaging a reflected portion of said pulse beam on said field-limiting slit;

two-dimensional detector means operatively connected to said streak tube for detecting said two-dimensional signal; and means for generating a volume display of said medium utilizing all, or substantially all, of the reflected portion of said pulse beam; and a diamond-arrangement mirror beam inverter that uses the Gaussian beam-shape properties of the pulse beam to enhance outer portions of the pulse beam.

2. A method for detecting a target in a turbid medium, said method comprising the steps of:

generating a pulse beam and illuminating a thin slice of such turbid medium utilizing the pulse beam, including utilizing a diamond-arrangement mirror beam inverter that uses the Gaussian beam-shape properties of the pulse beam to enhance outer portions of the pulse beam;

generating a two-dimensional signal with a streak tube having a cathode;

rejecting multiply reflected light utilizing a field-limiting slit disposed in front of the cathode;

imaging a reflected portion of the pulse beam on the field-limiting slit utilizing a light-collecting optical means disposed in front of the field-limiting slit;

detecting the two-dimensional signal generated by the streak tube utilizing a two-dimensional detector operatively connected to the streak tube; and generating a volume display of the medium utilizing all, or substantially all, of the reflected portion of the pulse beam.

3. A system for detecting a target in a turbid medium, comprising:

source means for generating a series of narrow, fan-shaped, pulse beams to illuminate sections of the turbid medium;

a streak tube comprising:

a photocathode for collecting reflected portions of the pulse beam and in response thereto emitting a corresponding flow of photoelectrons;

a pair of deflection electrodes for generating a deflection electric field, the deflection electrodes being adapted to deflect the photoelectrons emitted from said photocathode; and a phosphor layer for receiving the deflected photoelectrons and in response thereto emitting a corresponding flow of photons; and means for applying a varying voltage to the deflection electrodes to cause the photoelectrons from the photocathode to move rapidly across the phosphor layer, thus converting a temporal variation in the input signal into a spatial variation at the phosphor to create a two-dimensional signal utilizing all, or substantially all, of the reflected portions at the phosphor layer;

detector means operatively connected to the phosphor layer for detecting the two-dimensional signal;

a field-limiting slit for removing multiply scattered light;

optical means for collecting and imaging the reflected portions on the field-limiting slit;

means for generating a volume display of the turbid medium in depth utilizing all, or substantially all, of the reflected portions of the pulse beam; and a diamond-arrangement mirror beam inverter that uses the Gaussian beam-shape properties of the pulse beam to enhance the outer portions of the pulse beam.

4. An imaging system for detecting a target in a turbid medium, comprising:

source means for generating a series of narrow, fan-shaped, pulse beams to illuminate sections of the turbid medium;

a streak tube comprising:

a photocathode for collecting reflected portions of the pulse beam and in response thereto emitting a corresponding flow of photoelectrons;

a pair of deflection electrodes for generating a deflection electric field, the deflection electrodes being adapted to deflect the photoelectrons emitted from said photocathode; and a phosphor layer for receiving the deflected photoelectrons and in response thereto emitting a corresponding flow of photons; and means for applying a varying voltage to the deflection electrodes to cause the photoelectrons from the photocathode to move rapidly across the phosphor layer, thus converting a temporal variation in the input signal into a spatial variation at the phosphor to create a two-dimensional signal utilizing all, or substantially all, of the reflected portions at the phosphor layer;

detector means operatively connected to the phosphor layer for detecting the two-dimensional signal;

a field-limiting slit for removing multiply scattered light;

optical means for collecting and imaging the reflected portions on the field-limiting slit;

means for generating a volume display of the turbid medium in depth utilizing all, or substantially all, of the reflected portion of the pulse beam;

a second photocathode for receiving photons emitted from the phosphor and in response thereto emitting a corresponding flow of photoelectrons; and a microchannel plate intensifier for increasing the gain of photoelectrons emitted from the second photocathode; and a second phosphor layer for receiving photoelectrons emitted from the microchannel plate intensifier and in response thereto emitting a corresponding flow of photons, wherein the second phosphor is coupled to the detector means.

5. A system for imaging a volume of a turbid medium, namely an ocean volume, with objects therein, said system being for use with means for bodily transporting at least part of the system with respect to said turbid ocean volume, and said system comprising:

means for projecting a pulsed thin-fan-shaped beam to selectively illuminate, along an illumination-propagation direction, a thin section of such turbid ocean volume;

a streak tube, having a cathode for receiving reflected light back, approximately along the illumination-propagation direction, from the thin section of turbid ocean volume; said streak tube also having an anode end, and comprising:

first electronic means for forming at the anode end of the streak tube successive thin-strip-shaped electronic-image segments of the light successively received on the cathode from the illuminated turbid-ocean-volume thin section, and second electronic means for distributing the successive thin-strip-shaped electronic-image segments, along a direction generally perpendicular to a long dimension of the image segments, across the anode end of the streak tube, said distributing of the electronic-image segments being in accordance with elapsed time after operation of the beam-projecting means so that each thin-strip-shaped electronic-image segment is displaced from an edge of the anode end of the tube substantially in proportion to total propagation distance and time into and out from the turbid-medium thin section, to form a composite electronic image of the turbid-ocean-volume thin section as a function of propagation depth;

means for imposing a substantially common spatial definition and directional restriction, in one dimension, upon (1) the pulsed thin-fan-shaped beam projected by the projecting means and (2) the reflected light received back from the thin section of turbid ocean volume;

means for sequentially operating the beam-projecting means, during operation of such bodily-transporting means, to project a sequence of beam pulses to illuminate successive thin sections, and generate a corresponding sequence of composite electronic images; and means for processing the composite electronic images, wherein said sequence of electronic images can be used to produce a corresponding sequence of composite optical images which can be displayed to show a motion picture that emulates visual perceptions of travel through the successive thin sections of turbid ocean volume.

6. The imaging system of claim 5, wherein:

the beam penetrates the thin section during a first range of times corresponding to beam propagation depth into the thin section;

the cathode receives the reflected light during a second range of times corresponding to total propagation distances into and out from the thin section approximately along the illumination-propagation direction; said second range of times being substantially equal to propagation times within the thin section plus a substantially fixed delay substantially related to propagation times to and from the thin section;

said first electronic means forming the electronic-image segments at particular times corresponding to the particular total propagation distances for particular penetration depths; and said second electronic means distributing the electronic-image segments in accordance with the second range of times corresponding to total propagation distances into and out from the thin section.

7. The imaging system of claim 5, further comprising:

electrooptical means for receiving the electronic-image segments and in response producing corresponding optical-image segments to display a composite optical image.

8. The system of claim 5, wherein the common-restriction-imposing means comprise:

means for constraining, in said one dimension, the field from which said reflected light can reach said streak-tube cathode; and means for aligning, with respect to said one dimension, the field-constraining means with the thin-fan-shaped beam.

9. The system of claim 8, wherein:

the field-constraining means comprise an optical slit that is narrow in said one dimension; and the aligning means comprise means for aligning, with respect to said one dimension, the slit with the thin-fan-shaped beam.

10. The system of claim 9, wherein the common-restriction-imposing means further comprise:

means for limiting, with respect to said one dimension, the field illuminated by the thin-fan-shaped beam.

11. The system of claim 10, wherein:

the beam-field-limiting means comprise an anamorphic optical element for asymmetrically expanding a laser beam with cross-section on the order of a centimeter to strike an area on the ocean surface of a few meters by more than one thousand meters.

12. The system of claim 5, in combination with such bodily-transporting means; and wherein:

said combination further comprises the bodily-transporting means; and the bodily-transporting means comprise means for bodily displacing the beam-projecting means and streak tube together, along a direction generally perpendicular to a long dimension of the thin section of turbid ocean volume.

13. The system of claim 12, wherein:

the bodily-displacing means comprise an aircraft supporting the beam-projecting means and streak tube together and flying above the ocean along said direction generally perpendicular to a long dimension of the thin section of turbid ocean volume;

said beam-projecting means project said sequence of beam pulses downward from said aircraft, through air above the turbid ocean volume, and then downward into the turbid ocean volume; and said reflected light received back from the thin section of turbid ocean volume passes upward from the turbid ocean volume, through air above the turbid ocean volume, to said aircraft.

14. The system of claim 13, wherein:

a centerline of every beam pulse is substantially in a plane defined by (1) said direction of flight and (2) a vertical line; and a centerline of said reflected light received back from the thin section of turbid ocean volume is substantially in the same plane.

15. The system of claim 13, wherein:

said beam-projecting means effectively illuminate such objects in the thin section of turbid ocean volume;

said beam-projecting means do not effectively illuminate portions of the thin section of turbid ocean volume immediately below such objects;

said cathode effectively receives said reflected light back from such illuminated objects;

said cathode does not effectively receive reflected light back from the thin section of turbid ocean volume immediately below such objects;

said composite electronic images and composite optical images include images of such illuminated objects, and of the turbidity in the thin section of turbid ocean volume, arising from said effectively received reflected light; and said composite-optical-image motion picture includes shadow images below such illuminated objects, arising from absence of effectively received reflected light from said thin section of turbid ocean volume immediately below such illuminated objects.

16. The system of claim 12, wherein:

said beam-projecting means effectively illuminate such objects in the thin section of turbid ocean volume;

said beam-projecting means do not effectively illuminate portions of the thin section of turbid ocean volume immediately behind such objects;

said cathode effectively receives said reflected light back from such illuminated objects;

said cathode does not effectively receive reflected light back from the thin section of turbid ocean volume immediately behind such objects;

said composite-optical-image motion picture includes images of such illuminated objects, and of the turbidity in the thin section of turbid ocean volume, arising from said effectively received reflected light; and said composite-optical-image motion picture includes shadow images behind such illuminated objects, arising from absence of effectively received reflected light from said thin section of turbid ocean volume immediately behind such illuminated objects.

17. The system of claim 5, wherein:

said beam-projecting means effectively illuminate such objects in the thin section of turbid ocean volume;

said beam-projecting means do not effectively illuminate portions of the thin section of turbid ocean volume immediately behind such objects;

said cathode effectively receives said reflected light back from such illuminated objects;

said cathode does not effectively receive reflected light back from the thin section of turbid ocean volume immediately behind such objects;

said composite electronic images and composite optical images include images of such illuminated objects, and of the turbidity in the thin section of turbid ocean volume, arising from said effectively received reflected light; and said composite-optical-image motion picture includes shadow images behind such illuminated objects, arising from absence of effectively received reflected light from said thin section of turbid ocean volume immediately behind such illuminated objects.

18. A system for imaging a volume of a turbid medium, namely an ocean volume, with objects therein, said system being for use with means for bodily transporting at least part of the system with respect to said turbid ocean volume, and said system comprising:

means for projecting a pulsed thin-fan-shaped beam to selectively illuminate, along an illumination-propagation direction, a thin section of such turbid ocean volume; said beam penetrating and propagating within the thin section during a first range of times corresponding to beam propagation depth into the thin section;

a streak tube, having a cathode for receiving reflected light back, approximately along the illumination-propagation direction, from the thin section of turbid ocean volume during a second range of times corresponding to total propagation distances into and out from the thin section approximately along the illumination-propagation direction; said streak tube also having an anode end, and comprising:

first electronic means for forming at the anode end of the streak tube successive thin-strip-shaped electronic-image segments of the light successively received on the cathode from the illuminated turbid-ocean-volume thin section, at particular times corresponding to the particular total propagation distances for particular penetration depths, and second electronic means for distributing the successive thin-strip-shaped electronic image segments, along a direction generally perpendicular to a long dimension of the images, across the anode end of the streak tube in accordance with said second range of times corresponding to total propagation distances into and out from the thin section of turbid ocean volume, to form a composite electronic image of the turbid-ocean-volume thin section as a function of propagation depth;

means for imposing a substantially common spatial definition and directional restriction, in one dimension, upon (1) the pulsed thin-fan-shaped beam projected by the projecting means and (2) the reflected light received back from the thin section of turbid ocean volume;

means for sequentially operating the beam-projecting means, during operation of such bodily-transporting means, to project a sequence of beam pulses to illuminate successive thin sections, and generate a corresponding sequence of composite electronic images; and means for processing the composite electronic images to produce a corresponding sequence of composite optical images, and for visually displaying the sequence of composite optical images to show a motion picture that emulates visual perceptions of travel through the successive thin sections of turbid ocean volume.

19. The imaging system of claim 18, further comprising:

electrooptical means for receiving the electronic-image segments and in response producing corresponding optical-image segments to display a composite optical image.

20. The system of claim 19, in combination with such bodily-transporting means; and wherein:

said combination further comprises the bodily-transporting means; and the bodily-transporting means comprise means for bodily displacing the beam-projecting means and streak tube together, along a direction generally perpendicular to a long dimension of the thin section of turbid ocean volume.

21. The system of claim 20, wherein:

the bodily-displacing means comprise an aircraft supporting the beam-projecting means and streak tube together and flying above the ocean along said direction generally perpendicular to a long dimension of the thin section of turbid ocean volume;

said beam-projecting means project said sequence of beam pulses downward from said aircraft, through air above the turbid ocean volume, and then downward into the turbid ocean volume; and said reflected light received back from the thin section of ocean volume passes upward from the ocean volume, through air above the ocean volume, to said aircraft.

22. The system of claim 21, wherein:

a centerline of every beam pulse is substantially in a plane defined by (1) said direction of flight and (2) a vertical line; and a centerline of said reflected light received back from the thin section of turbid medium is substantially in the same plane.

23. The system of claim 21, wherein:

said beam-projecting means effectively illuminate such objects in the thin section of turbid ocean volume;

said beam-projecting means do not effectively illuminate portions of the thin section of turbid ocean volume immediately below such objects;

said cathode effectively receives said reflected light back from such illuminated objects;

said cathode does not effectively receive reflected light back from the thin section of turbid ocean volume immediately below such objects;

said composite electronic images and composite optical images include images of such illuminated objects, and of the turbidity in the thin section of turbid ocean volume, arising from said effectively received reflected light; and said composite-optical-image motion picture includes shadow images below such illuminated objects, arising from absence of effectively received reflected light from said thin section of turbid ocean volume immediately below such illuminated objects.

24. The system of claim 20, wherein:

said beam-projecting means effectively illuminate such objects in the thin section of turbid ocean volume;

said beam-projecting means do not effectively illuminate portions of the thin section of turbid ocean volume immediately behind such objects;

said cathode effectively receives said reflected light back from such illuminated objects;

said cathode does not effectively receive reflected light back from the thin section of turbid ocean volume immediately behind such objects;

said composite-optical-image motion picture includes images of such illuminated objects, and of the turbidity in the thin section of turbid ocean volume, arising from said effectively received reflected light; and said composite-optical-image motion picture includes shadow images behind such illuminated objects, arising from absence of effectively received reflected light from said thin section of turbid ocean volume immediately behind such illuminated objects.

25. The system of claim 18, further comprising:

means for roughly compensating for geometrical effects such as increased path length to beam-pattern ends, or cosine losses on illumination and on return, that systematically vary the intensity of reflected light, along the long dimension of the thin section of turbid ocean volume.

26. The imaging system of claim 18, wherein:

the beam-projecting means comprise means for projecting the pulsed beam with very short duration, and substantially in the shape of a line that is extended perpendicular to the illumination-propagation direction, to selectively illuminate a succession of substantially line-shaped thin shallow volumes of the turbid--ocean-volume thin section at successive propagation depths respectively; and said streak-tube cathode receives the reflected light successively from said succession of substantially line-shaped thin shallow volumes, respectively.

27. The system of claim 18, wherein:

the first electronic means operate over a range of times beginning substantially with receipt of reflection from the surface of the turbid-ocean-volume thin section; and the second electronic means operate over substantially the same range of times to form the composite image extending from a line that represents the surface of the turbid-ocean-volume thin section toward lines representing the interior of the turbid-ocean-volume.

28. The system of claim 18, wherein:

the first electronic means operate over a range of times ending substantially with receipt of optical information by the system indicating that a limit of penetration depth has been reached; and the second electronic means operate over substantially the same range of times to form the composite image from lines representing the interior of the turbid-ocean-volume thin section to a line representing the limit of propagation depth.

29. The system of claim 18, wherein:

the beam-projecting means comprise means for projecting the pulsed beam to penetrate the turbid-ocean-volume thin section to reach a substantially light-impenetrable surface beyond the turbid-ocean-volume thin section;

said surface having a surface relief that comprises plural levels of said light-impenetrable surface, successively encountered by the pulsed beam in propagating along the illumination-propagation direction; and the second electronic means form said composite image including a profile of the light-impenetrable surface relief.

30. The system of claim 18, further comprising:

means for roughly compensating for geometrical effects that systematically vary the intensity of reflected light along the long dimension of the thin section of turbid-ocean-volume;

said roughly-compensating means comprising optical means for generally reversing the relative intensities of (1) the light projected near ends of the thin-fan-shaped beam with respect to (2) the light projected near the center of the thin-fan-shaped beam.

31. The system of claim 18, wherein:

said composite-image processing and sequence-displaying means comprise means selected from the group consisting of:

means for using the sequence of composite electronic images to display a video sequence that emulates visual perceptions of travel through the successive thin sections of turbid ocean volume, and means for recording the sequence of composite electronic images to be used later in displaying such a video sequence.

32. The system of claim 31, in combination with such bodily-transporting means; and wherein:

said combination further comprises the bodily-transporting means;

the bodily-transporting means comprise an aircraft supporting the beam-projecting means and streak tube together and flying above the turbid ocean volume along a direction generally perpendicular to a long dimension of the thin section of turbid ocean volume;

said beam-projecting means project said sequence of beam pulses downward from said aircraft, through air above the turbid ocean volume, and then downward into the turbid ocean volume; and said reflected light received back from the thin section of turbid ocean volume passes upward from the turbid ocean volume, through air above the turbid ocean volume, to said aircraft.

33. The system of claim 32, wherein:

a centerline of every beam pulse is substantially in a plane defined by (1) said direction of flight and (2) a vertical line; and a centerline of said reflected light received back from the thin section of turbid ocean volume is substantially in the same plane.

34. The system of claim 32, wherein:

said beam-projecting means effectively illuminate such objects in the thin section of turbid ocean volume;

said beam-projecting means do not effectively illuminate portions of the thin section of turbid ocean volume immediately below such objects;

said cathode effectively receives said reflected light back from such illuminated objects;

said cathode does not effectively receive reflected light back from the thin section of turbid ocean volume immediately below such objects;

said video sequence, displayed by the electronic-image-sequence using means, includes visible images of:

such illuminated objects, and of the turbidity in the thin section of turbid ocean volume, arising from said effectively received reflected light, and shadows below such illuminated objects, arising from absence of effectively received reflected light from said thin section of turbid ocean volume immediately below such illuminated objects.

35. The system of claim 31, wherein:

said beam-projecting means effectively illuminate such objects in the thin section of turbid ocean volume;

said beam-projecting means do not effectively illuminate portions of the thin section of turbid ocean volume immediately behind such objects;

said cathode effectively receives said reflected light back from such illuminated objects;

said cathode does not effectively receive reflected light back from the thin section of turbid ocean volume immediately behind such objects;

said video sequence, displayed by the electronic-image-sequence using means, includes visible images of:
such illuminated objects, and of the turbidity in the thin section of turbid ocean volume, arising from said effectively received reflected light, and
shadows behind such illuminated objects, arising from absence of effectively received reflected light from said thin section of turbid ocean volume immediately behind such illuminated objects.

36. The imaging system of claim 18, further comprising:
a detector array for receiving the composite electronic image and in response producing a corresponding data array; and
data-array utilization means selected from the group consisting of:
a video display for receiving the data array and in response displaying a corresponding optical image, and
means for recording the data array to be displayed later.

37. The system of claim 18, wherein:
said beam-projecting means effectively illuminate such objects in the thin section of turbid ocean volume;
said beam-projecting means do not effectively illuminate portions of the thin section of turbid ocean volume immediately behind such objects;
said cathode effectively receives said reflected light back from such illuminated objects;
said cathode does not effectively receive reflected light back from the thin section of turbid ocean volume immediately behind such objects;
said composite electronic images and composite optical images include images of such illuminated objects, and of the turbidity in the thin section of turbid ocean volume, arising from said effectively received reflected light; and
said composite-optical-image motion picture includes shadow images behind such illuminated objects, arising from absence of effectively received reflected light from said thin section of turbid ocean volume immediately behind such illuminated objects.

38. A system for imaging a volume of a turbid medium, namely an ocean volume, with objects therein, said system being for use with means for bodily transporting at least part of the system with respect to said turbid ocean volume; said system comprising:
means for projecting a pulsed thin-fan-shaped beam to selectively illuminate a thin section of such turbid ocean volume;
a streak-tube cathode for receiving reflected light back, approximately along the illumination-propagation direction, from the thin section of turbid ocean volume;
means for focusing the reflected light onto the streak-tube cathode substantially directly;
said focusing means comprising:
(1) no "glass plate stack" image slicer for optically mapping portions of said reflected light onto portions of a light-receiving surface, and
(2) no other type of image slicer for optically mapping portions of said reflected light onto portions of a light-receiving surface, and
(3) no pixel-encoding fiber bundle for optically mapping a two-dimensional reflected image into a line image, and
(4) no other pixel-encoding fiber bundle for optical mapping of a reflected image, and
(5) no other optical image-mapping device other than basic optical elements such as a lens or mirror;
streak-tube means, responsive to the focused reflected light, for forming therefrom a corresponding composite electronic image of the turbid-ocean-volume thin section as a function of propagation depth;
means for restricting the light received by the streak-tube cathode, from the focusing means, to substantially only reflection directly from said selectively illuminated thin section;
means for sequentially operating the beam-projecting means, during operation of such bodily-transporting means, to project a sequence of beam pulses to illuminate successive thin sections, and generate a corresponding sequence of composite electronic images; and
means for processing the composite electronic images, wherein said sequence of electronic images can be used to produce a corresponding sequence of composite optical images which can be displayed to show a motion picture that emulates visual perceptions of travel through the successive thin sections of turbid ocean volume.

39. The imaging system of claim 38, further comprising:
electrooptical means for receiving the composite electronic image and in response producing corresponding optical-image segments to display a composite optical image.

40. The system of claim 39, in combination with such bodily-transporting means; and wherein:
said combination further comprises the bodily-transporting means; and
the bodily transporting means comprise means for displacing the beam-projecting means and streak-tube means together, along a direction generally perpendicular to a long dimension of the thin section of turbid-ocean-volume.

41. A method of imaging a turbid medium, namely an ocean volume, with objects therein, said method comprising the steps of:
projecting a pulsed thin-fan-shaped beam to selectively illuminate, along an illumination-propagation direction, a thin section of such turbid ocean volume;
then at a substantially common location with the projecting step, receiving reflected light back, approximately along the illumination-propagation direction, from the thin section of turbid ocean volume;
the projecting and receiving steps imposing a substantially common spatial definition and directional restriction, in one dimension, on the thin-fan-shaped beam and received reflection;
forming successive thin-strip-shaped image segments which are respectively images of the reflected light successively received along approximately the illumination-propagation direction;
distributing the successive thin-strip-shaped image segments, along a direction generally perpendicular to a long dimension of the images;
said distributing of the image segments being in accordance with elapsed time after the beam-projecting step so that each thin-strip-shaped image segment is displaced from a common baseline position substantially in proportion to total propagation distance and time into and out from the turbid ocean volume, to form a composite image of the turbid-ocean-volume thin section as a function of propagation depth;

shifting said common location in a direction roughly at right angles to both (1) a long dimension of the thin-fan-shaped beam and (2) the illumination-propagation direction;

repeating all of the above steps multiple times to form multiple composite images of progressively encountered turbid-ocean-volume thin sections as a function of propagation depth; and visually displaying the multiple composite images sequentially to show a motion picture that emulates visual perceptions of travel through the turbid ocean volume along said direction of said shifting step.

42. The method of claim 41, further comprising:

displaying the sequence of composite images in human-visible form, as a motion picture that emulates visual perceptions of travel through the turbid-ocean-volume.

43. The method of claim 41, wherein:

the image-segment forming step is at least in part an electronic step, and the successive thin-strip-shaped image segments of the reflected light are electronic image segments; and the distributing step is at least in part an electronic step.

44. The method of claim 43, wherein:

the successive thin-strip-shaped image segments are distributed by deflection of an electron beam forming said electronic images.

45. The method of claim 41, particularly for use with substantially thin-strip-shaped light-sensitive photoelectronic means, and wherein the image-segment forming step comprises:

optically focusing said received light, reflected from the thin-fan-shaped beam, onto the substantially thin-strip-shaped light-sensitive photoelectronic means so that intensity variations along the reflection of the thin-fan-shaped beam, within said focused light, are arrayed along the photoelectronic means; and response of the photoelectronic means to said received reflected light by generation of a corresponding substantially unidimensional electronic signal array, wherein electronic signal variations along the array correspond to said intensity variations of the focused light along the photoelectronic means;

whereby said successive thin-strip-shaped image segments take the form of successive substantially unidimensional electronic signal arrays.

46. The method of claim 45, wherein:

the distributing step comprises applying the successive substantially unidimensional electronic signal arrays to control successive optical-image lines of a two-dimensional display device, to construct said composite image of the turbid-ocean-volume thin section as a function of propagation depth.

47. The method of claim 41, wherein:

said common-location-shifting step is after the projecting and receiving steps; and at least the projecting, receiving and shifting steps are in that order.

* * * * *